United States Patent [19]
Brennan, Jr. et al.

[11] 3,978,766
[45] Sept. 7, 1976

[54] APPARATUS AND METHOD FOR MACHINING CONTINUOUS MIXER AGITATORS AND THE LIKE

[75] Inventors: Ambrose K. Brennan, Jr.; Norris H. Whisler, both of York, Pa.

[73] Assignee: Teledyne Industries, Inc., Los Angeles, Calif.

[22] Filed: Feb. 3, 1975

[21] Appl. No.: 546,817

[52] U.S. Cl. .................................. 90/24.5; 90/31; 82/2 R; 82/2 D; 82/5; 82/18; 82/1 C
[51] Int. Cl.² .................... B23D 5/04; B23D 5/00; B23B 3/00; B23B 1/00
[58] Field of Search .................... 82/18, 5, 5.5, 2 R, 82/2 D, 34; 90/24.5, 29, 30, 31, 26; 29/27 R, 27 A, 30

[56] References Cited
UNITED STATES PATENTS

| | | | |
|---|---|---|---|
| 1,543,236 | 6/1925 | Sears | 82/2 D |
| 2,986,055 | 5/1961 | Kasselmann | 82/5 |
| 3,203,316 | 8/1965 | Cashman | 82/2 R |
| 3,244,037 | 4/1966 | Reuhmer | 82/5 |
| 3,545,018 | 8/1970 | Peterson | 82/5 |
| 3,742,791 | 7/1973 | Sato | 82/2 D |
| 3,851,992 | 12/1974 | Sawada | 90/31 |

*Primary Examiner*—Harrison L. Hinson
*Attorney, Agent, or Firm*—Shoemaker and Mattare, Ltd.

[57] ABSTRACT

Apparatus for machining a desired profile in a continuous mixer agitator and the like includes an attachment for a vertical boring mill or lathe and the like, wherein the attachment comprises a base plate with mounting structure to secure the base plate on the table of the boring mill or face plate of the lathe, and a rotary indexing table is carried by the base plate in an offset position relative to the center of the table or face plate and the like, said indexing table rotatably supporting the agitator on the base plate and the base plate rotatably supporting the indexing table, such that by properly adjusting the offset and speed of rotation of the indexing table, a desired profile is automatically machined in the agitator. The method of machining continuous mixer agitators includes the steps of determining the profile desired in the agitator, determining at least one radius of curvature necessary to generate an arc to obtain the desired profile, determining the center for the radius of curvature, and wherein the center corresponds to the center of a lathe or vertical boring mill and the like and then positioning the agitator to be machined with its center a distance from the center of the lathe or vertical boring mill and the like an amount necessary to obtain the offset to accomplish machining of the desired profile on the agitator as the agitator is orbitally rotated about the center.

8 Claims, 8 Drawing Figures

3,978,766

APPARATUS AND METHOD FOR MACHINING CONTINUOUS MIXER AGITATORS AND THE LIKE

BACKGROUND OF THE INVENTION

Continuous mixers or processors, such as that manufactured by Teledyne Readco, York, Pa., utilize self-wiping, corotating two lobe continuous mixer agitators and the cross-section or profile of the agitators can be described by various methods. Heretofore, the methods and apparatus for obtaining the desired profile in the agitators has been very complicated, time consuming and expensive, and complex casting and machining operations were necessary to be performed.

In accordance with the present invention, a unique attachment is provided for a turning machine, such as vertical boring mill or a lathe and the like, wherein either a solid bar of steel or a rough casting of a continuous mixer agitator is supported for orbital rotation about the center of the table or face plate, and the attachment includes means which may be adjusted to effect the desired orbital motion and speed of rotation of the agitator to machine the desired profile therein.

Moreover, the present invention teaches a method of machining a desired profile into a continuous mixer agitator, wherein the radius or radii of curvature of the flanks of the agitator are determined and the center of the radius of curvature is spaced from the center of the agitator a distance which is selected as the offset of the center of the agitator from the center of the lathe or vertical boring mill and the like to effect the necessary machining thereon to obtain the desired profile. In order to machine opposite flanks in the agitator, it is necessary only to make a simple adjustment in the attachment to cause relative movement between the agitator and a cutting tool to machine any desired flank of the agitator.

OBJECTS OF THE INVENTION

It is an object of this invention to provide an attachment for a vertical boring mill or a lathe and the like for automatically machining a desired profile in a continuous mixer agitator, wherein the attachment includes a rotary indexing table supporting the agitator and wherein the center of the indexing table and thus the agitator is offset from the center of the vertical boring mill or lathe an amount necessary to effect a predetermined orbital movement of the agitator around the center of the vertical boring mill or lathe to machine the desired profile in the agitator.

Another object is to provide a method of machining a desired profile into a continuous mixer agitator, wherein the radius of curvature of the flank of the agitator is determined and the center of this radius of curvature is then positioned relative to the center of the vertical boring mill or lathe and the like, such that when the center of the agitator is offset from the center of the lathe or vertical boring mill and the like by a predetermined amount, the desired profile is automatically machined into the agitator.

DETAILED DESCRIPTION OF THE INVENTION

Figure 1:
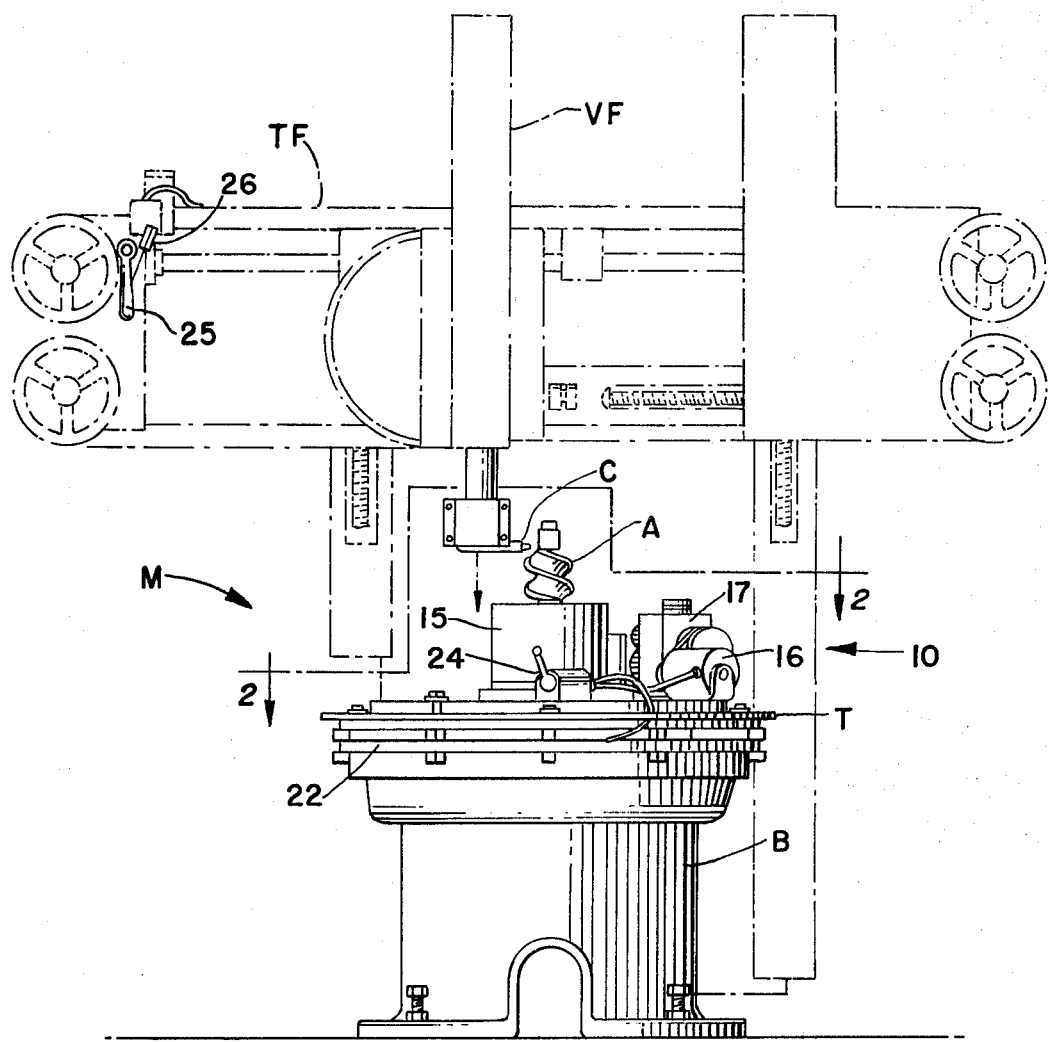
FIG. 1 is a view in elevation with portions in phantom line of a vertical boring mill having an attachment according to the invention thereon.

In the drawings, wherein like reference numerals indicate like parts throughout the several views, a vertical boring mill M includes a base B and rotatable table T mounted thereon. The vertical boring mill also includes a crossfeed or transverse feed TF and a vertical feed VF for positioning and guiding a cutting tool C relative to the workpiece, such as agitator A and the like.

In ordinary usage, a workpiece would be supported on the table T, which has a chuck-like mechanism thereon, and the table T would be rotated and the cutting tool C would be properly positioned so as to intercept the path of movement of the workpiece and moved downwardly simultaneously with rotatable movement of the workpiece to effect a desired milling operation on the workpiece.

In accordance with the present invention, an attachment 10 is provided for securement to the table T of the vertical boring mill M, whereby self-wiping, corotating two lobe continuous mixer agitators can be quickly and easily machined with a minimum amount of effort and with easily performed adjustments to the attachment and vertical boring mill M.

The attachment 10 comprises a substantially disc-shaped base plate 11 secured to the table T by means of a plurality of bolts or the like 12 engaged in radially extending slots 13 at the periphery of the base plate or the like or by other suitable means, as desired.

A rotary indexing table 14 of conventional construction, as manufactured, for example, by Gidding and Lewis Machine Tool, Wisconsin, is secured on the base plate 11 offset from the center of the base plate and table T. The distance by which the center of the rotary indexing table 14 is offset from the center of the base plate 11 and table T is determined in a manner described hereinafter with reference to FIGS. 7 and 8.

A spacer block 15 is secured to the rotary indexing table 14 and an agitator blade A to be machined is secured on top of the spacer block 15 in a position for engagement with the cutting tool C during orbital movements of the rotary indexing table 14.

A suitable electric motor 16 is also secured on the base plate 11 and is connected through suitable gear reduction units 17 and 18 and gear sets 19, 20 and 21 with the rotary indexing table 14 to effect rotation of the table and thus the spacer block 15 and agitator A relative to the base plate 11. Electrical power for the motor 16 is taken from a slip ring 22 mounted on the base B of the machine and electrically connected to the motor via electrical cables 23 and switch 24. The switch 24 is operable to effect rotation of the motor 16 in opposite directions, and the gear reduction unit 17 has means to enable the gear ratio to be changed to thereby effect different speeds of rotation of the rotary indexing table and thus of the agitator A.

In use of the attachment, the amount of offset of the center of the rotary indexing table 14 from the center of the base plate 11 and table T of the vertical boring mill is determined, and the rotary indexing table is secured to the base plate 11 in the offset position and the proper lead of the screw of the agitator A is determined and the relative speeds between the cutting tool feed and the rate of rotation of the rotary indexing table and of the table T are determined, and the gears and rate of speeds set accordingly.

Figure 2:
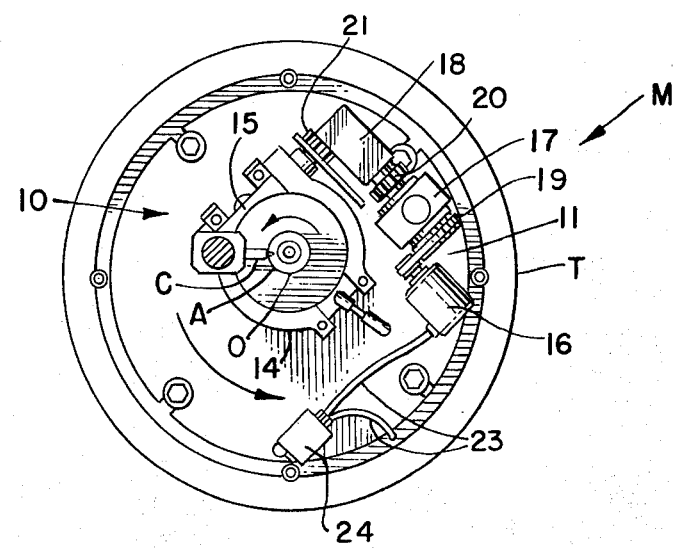
FIG. 2 is a plan view of the attachment and a portion of the vertical boring mill taken along line 2—2 in FIG. 1.

In one embodiment, a lever 25 is mounted on the vertical boring mill M, which when operated initiates vertical feed of the cutting tool C and rotation of the table T. A microswitch or other suitable device 26 is positioned relative to the lever 25 such that upon actuation of the lever, the microswitch is operated to automatically and simultaneously effect energization of the motor 16 and thus operation of the rotary indexing table 14. Accordingly, as seen in FIG. 2, for example, the agitator A is caused to move with an orbital motion, rotating about its own axis, as well as rotating about the center 0 of the base plate 11 and table T. Thus, with each pass of the agitator A past the cutting tool C, a cut is taken from a different portion of the agitator A and the downward feed of the cutting tool C and rate of rotation of the agitator A are selected such that when the cutting tool C has reached its downward limit of travel, one flank of the agitator A is shaped. In order to machine the other flank of the agitator A, the rotary indexing table is set 180° from its initial setting and the motor is once again operated to effect orbital movement of the agitator A and cutting or machining of the other flank thereof. In this connection, refer to FIGS. 7 and 8.

Figure 7:
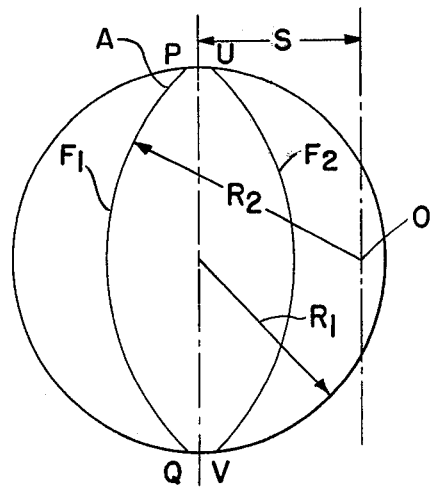
FIGS. 7 and 8 are schematic diagrams illustrating the manner in which the radii of curvature and offset are determined for machining a desired profile into an agitator.

In FIG. 7 a first approximation of a theoretically self-wiping contour of an agitator is diagrammatically illustrated. The agitator A has opposite flanks F1 and F2 of constant radius of curvature R2, and the flanks terminate in crests PU and QV. The width or size of the crests PU and QV is determined by the amount of offset S from the center of the agitator A to the center of curvature O for radius R2 of the flanks F1 and F2. As seen in FIG. 7, for a finite crest the offset S is less than the radius R1, but it is apparent that for a theoretically perfect condition in which the crest is zero, the offset S would equal R1. The circle described by radius R1 represents a chamber in which the agitator A would rotate. Due to strength requirements and the necessity of the agitator A to be able to transfer or transmit a considerable horsepower rating therethrough, it is not feasible to have a zero crest, and accordingly, some finite measurement of PU and QV is designed into the agitator A. Thus, once the desired dimensions are obtained, the center of the rotary indexing table 14 is positioned a distance equal to S from the center 0 of the base plate 11 and table T.

Figure 8:
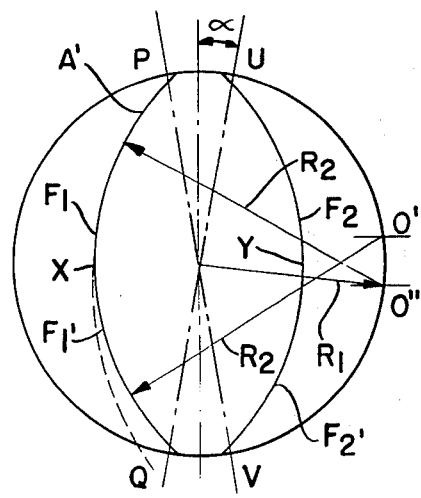

In FIG. 8 a closer approximation of a truly perfect shape for a continuous mixer agitator is diagrammatically illustrated, and in this agitator A' two centers of curvature O' and O" are used for striking each flank whereby opposite sides of the agitator A' comprise first and second flanks F1 and F1' and F2 and F2', respectively. It is apparent that if the crests PU and QV of agitator A' are zero, then the points O' and O" merge and the shape would be the same as for the agitator A of FIG. 7, when the offset S is equal to radius R1. The offset for agitator A' is equal to radius R1, and when machining an agitator according to this method, the rotary indexing table 14 would be set at some arbitrary point such as zero and the starting point for flank PX of agitator A' is zero plus angle α. For flank XQ, the starting point is zero minus angle α, and for the opposite flanks, the starting points would be 180° from the first points.

Figure 5:
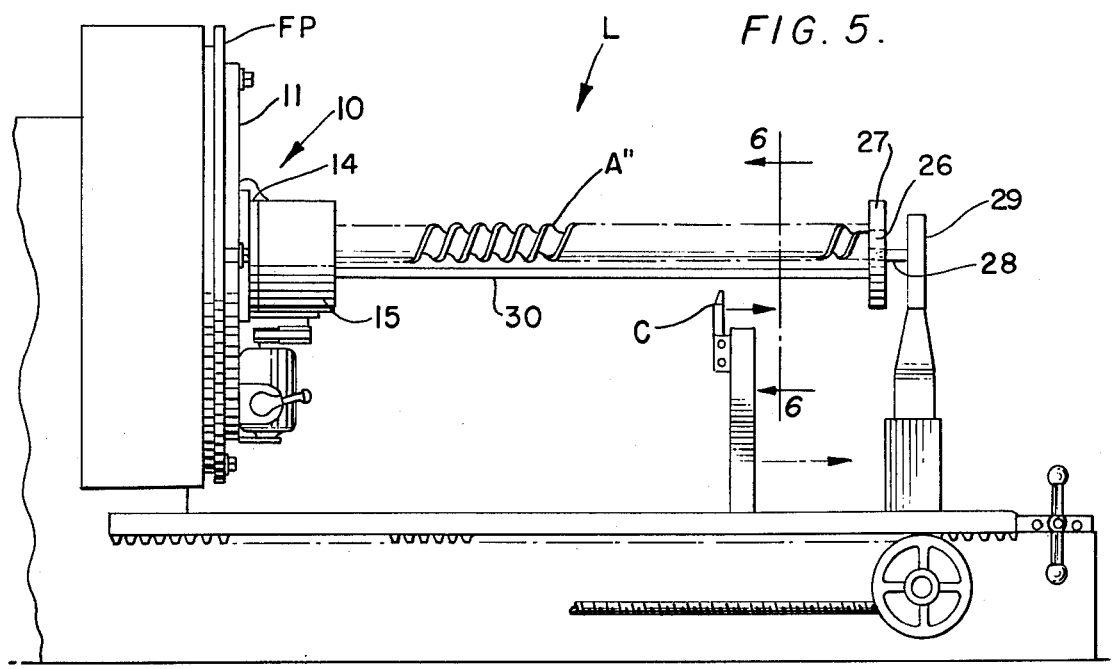
FIG. 5 is a fragmentary view in elevation of a lathe having the attachment of the invention secured thereto for machining a desired profile into an elongate continuous mixer agitator.
Figure 6:
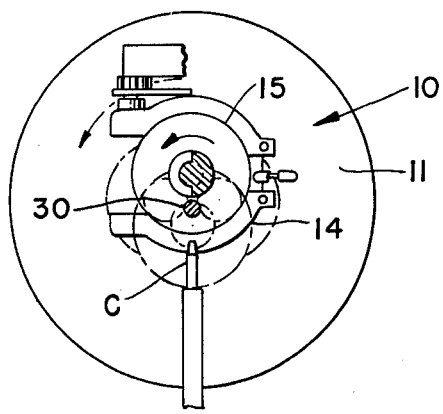
FIG. 6 is a view in section taken along line 6—6 in FIG. 5.

In FIGS. 5 and 6, the invention is shown applied to a horizontal lathe L and the entire attachment 10 is merely bolted or otherwise suitably secured to the face plate FP of the lathe and an elongate agitator shaft A" is supported at one end by the spacer block 15 mounted on the rotary indexing table 14, and the other end of the agitator A" is rotatably supported in an opening 26 through an adapter plate 27, which is rotatably supported at its center on the spindle 28 of the tailstock 29 of the lathe L. A connector bar 30 is connected at one end with the base plate 11 and at its other end with the adapter plate 27 to impart rotation of the base plate to the adapter plate, whereby the agitator A" is caused to rotate with an orbital motion about the center line of the lathe to thus engage the cutting tool C upon each pass thereof. In all other respects, the operation of the invention is the same as that described previously.

For example, a lathe L would be used in place of the vertical boring mill M when the length of the agitator A" is too great to be accommodated in the vertical boring mill.

Various means may be utilized to maintain the proper relationship between the rate of rotation of the rotary indexing table and the lead screw moving the cutting tool C. One example of a suitable means is a series of right angle drives (not shown) connected with the drive for the spindle of the lathe and connected to the lead screw. Provisions such as change gears and the like would be made in this arrangement to provide different speed relationships between the two parts. Another drive arrangement could consist of a synchronous motor connected with the rotary indexing table through a series of variable gear ratios, with the speed of rotation of the motor set to coincide with a predetermined speed of travel of the carriage or cutting tool to produce the desired lead of the helical screw shape of the agitator A". In this situation, means such as limit switches or the like would be provided to effect simultaneous operation of the rotary indexing table and lead screw power means. In the embodiment shown in FIG. 5 a synchronous motor with variable gear ratios and limit switch means are provided similar to that shown in FIG. 1 for the vertical boring mill application of the invention.

Figure 3:
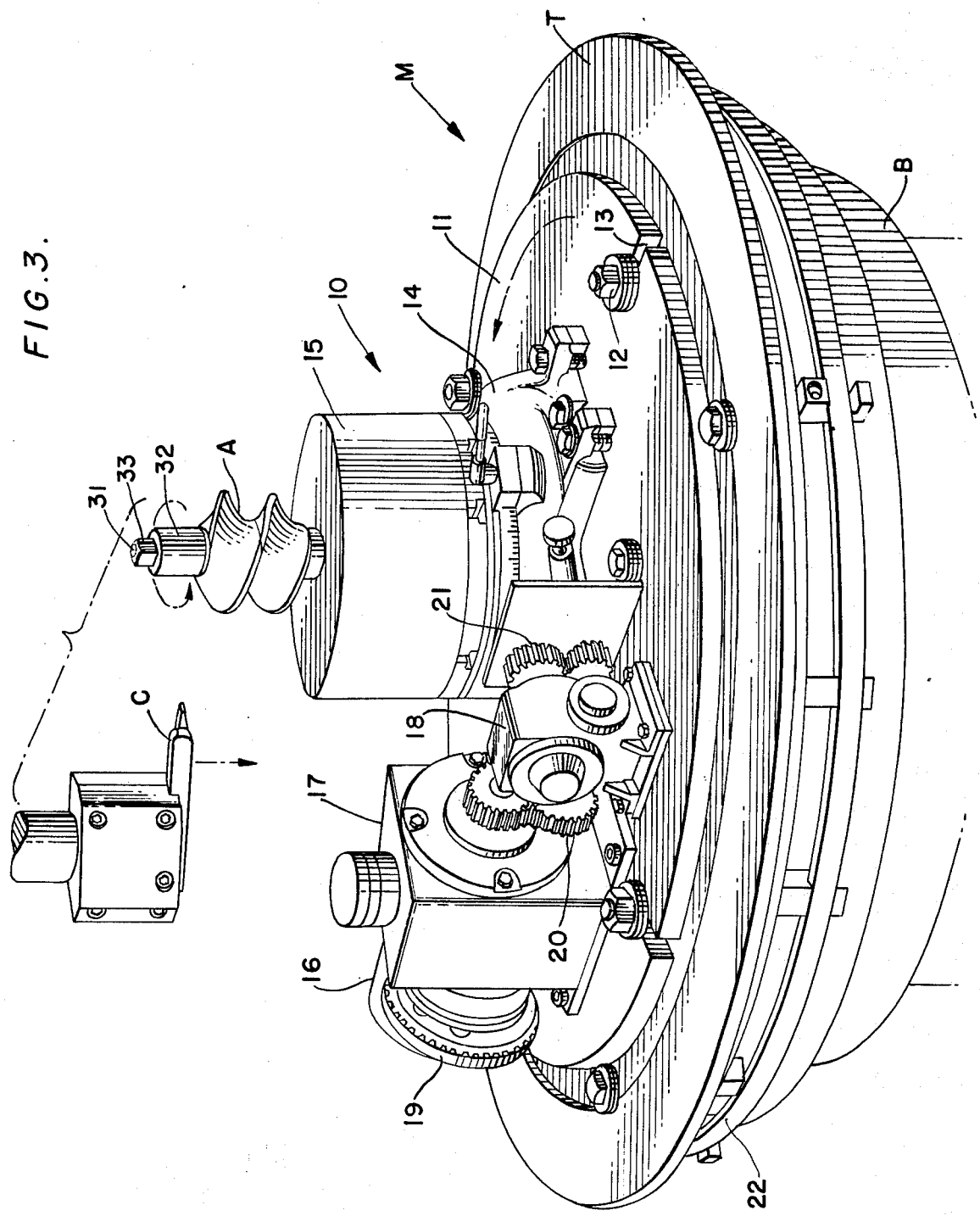
FIG. 3 is an enlarged, top perspective view of a portion of the boring mill and the attachment in accordance with the invention.
Figure 4:
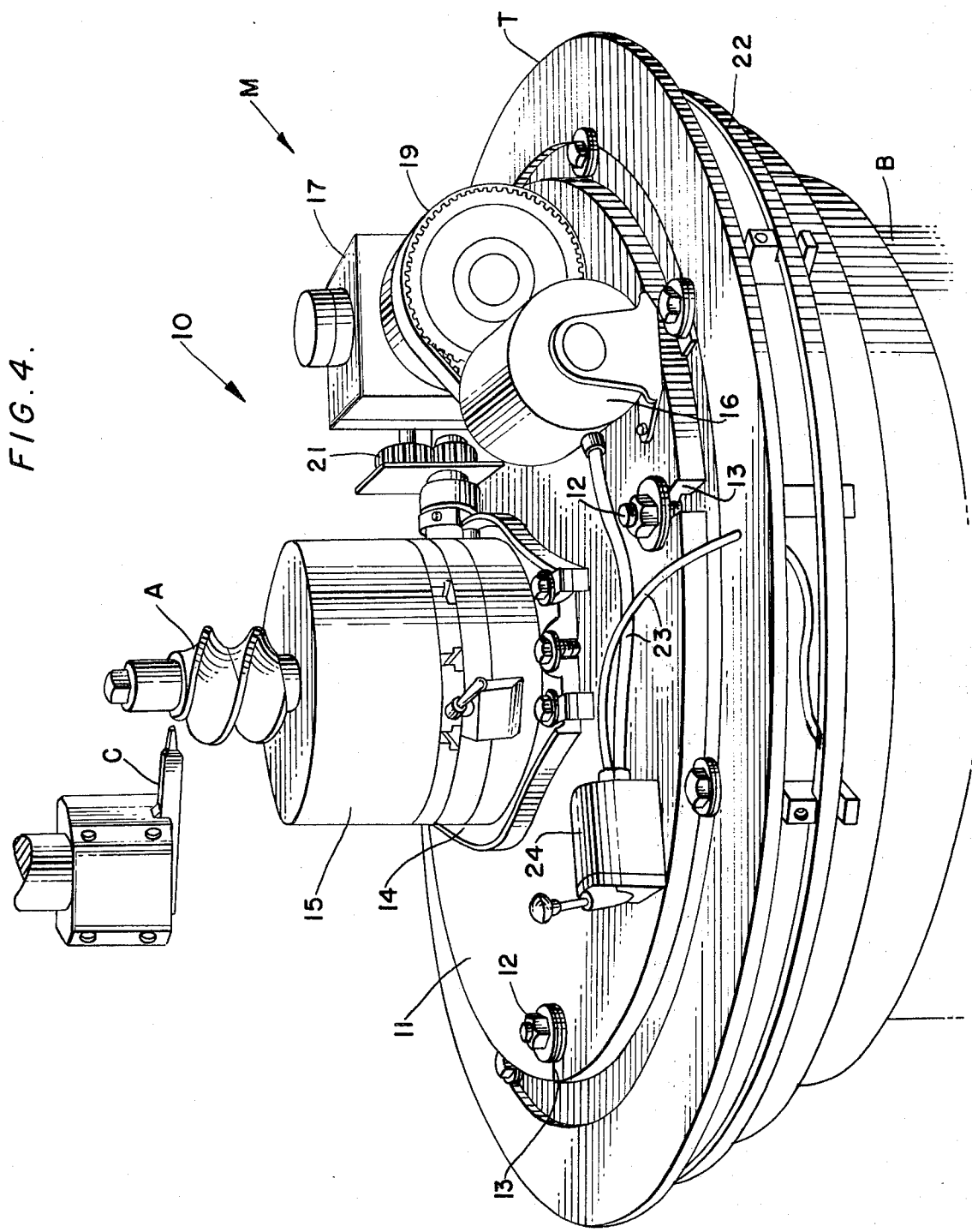
FIG. 4 is a view similar to FIG. 3 with the rotary indexing table rotated to a different position from that shown in FIG. 3.

As best seen in FIGS. 3 and 4, the agitator A is secured to the spacer by means of an elongate bolt 31 extended upwardly through the hollow interior of the agitator, and a spacer sleeve 32 (to compensate for different length agitators) and nut 33 are engaged thereon to securely hold the agitator in position. Other suitable means could be used to hold the agitator in place, if desired.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

We claim:

1. A turning machine for machining a desired profile into a workpiece, said machine including a rotatable member rotatable about a first axis, and to which a workpiece is normally secured for rotation of the workpiece about said axis; an attachment secured to the rotatable member for supporting a workpiece thereon eccentrically relative to said axis, said attachment comprising a base plate coaxially attached to the rotatable member for rotation therewith; a rotary table attached to the base plate in predetermined, radially offset position relative to the axis of rotation of the base plate, and rotatable about a second axis parallel to and spaced from the axis of the rotatable member; means securing a workpiece to be machined coaxially on the rotary table for rotation therewith; motor means connected with the table to rotate the table relative to the base plate simultaneously with rotation of the rotatable member, to thereby obtain orbital movement of the workpiece about the axis of rotation of the rotatable member; and a cutting tool carried by the machine for movement parallel to the axis of rotation of the workpiece, simultaneously with the orbital movement of the workpiece, to machine a desired profile in the workpiece.

2. A machine as in claim 1, wherein change speed gear means is connected between the motor means and the rotary indexing table to change the speed of rotation of the indexing table.

3. A machine as in claim 1, wherein a spacer block is secured on top of the rotary indexing table and the workpiece is secured on top of the spacer block.

4. A machine as in claim 1, wherein the base plate is substantially disc-shaped and is secured to a rotary table of a vertical boring mill, change speed gear means supported on the base plate and connected between the motor means and rotary indexing table to change the speed of rotation of the indexing table, a spacer block secured on top of the rotary indexing table, said workpiece being secured on top of the spacer block, and slip ring means on the table of the vertical boring mill for transferring electrical power from a source to the motor means.

5. A machine as in claim 4, wherein a reverse switch means is carried by the base plate and is connected with the motor means for reversing the direction of rotation of the motor means, and said change speed gear means includes a pair of gear reduction units connected through right angle gear drive means between the motor means and rotary indexing table and one of said gear reduction units has means enabling the gear ratio therein to be changed.

6. The method of machining a desired profile into a self-wiping, corotating, continuous mixer agitator, having opposite, convex, curved flanks, and opposite crests, comprising the steps of determining the size of the crests desired and determining the radius of curvature desired for the flanks, measuring the offset of the center for the radius of curvature of the flanks from the center of the agitator, providing an attachment for a vertical boring mill or lathe and the like, wherein the attachment includes a rotary indexing table, supporting the agitator to be machined on the rotary indexing table, positioning the center of the rotary indexing table a distance from the center of the vertical boring mill or lathe and the like a distance equal to the aforesaid offset, setting the rotary indexing table to a predetermined first setting to machine at least one flank of the agitator, and energizing the vertical boring mill or lathe and the like and substantially simultaneously therewith energizing the rotary indexing table to effect rotation of the rotary indexing table about its axis and also to effect rotation of the vertical boring mill or lathe and the like to thus obtain orbital motion of the agitator and movement of the agitator relative to a cutting tool to machine at least one flank of the desired profile therein.

7. A method as in claim 6, including the step of setting the rotary indexing table 180° from the first setting to machine the other flank of the agitator.

8. A method as in claim 7, including the steps of giving each flank two radii of curvature, and wherein a line drawn from the center of the agitator outwardly past one edge of the crest subtends an angle $\alpha$, and setting the rotary indexing table at said first setting plus the angle $\alpha$ for machining half of the flank, and setting the rotary indexing table at said first setting minus the angle $\alpha$ for machining the other half of the flank.

* * * * *